United States Patent
Fitz et al.

(10) Patent No.: US 12,483,844 B2
(45) Date of Patent: Nov. 25, 2025

(54) NEURAL NETWORK-DRIVEN FEEDBACK CANCELLATION

(71) Applicant: Starkey Laboratories, Inc., Eden Prairie, MN (US)

(72) Inventors: Kelly Fitz, Eden Prairie, MN (US); Carlos Renato Calcada Nakagawa, Eden Prairie, MN (US); Tao Zhang, Eden Prairie, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 0 days.

(21) Appl. No.: 18/632,844

(22) Filed: Apr. 11, 2024

(65) Prior Publication Data
US 2024/0348994 A1  Oct. 17, 2024

Related U.S. Application Data

(63) Continuation of application No. 18/120,665, filed on Mar. 13, 2023, now Pat. No. 11,985,482, which is a continuation of application No. 17/249,581, filed on Mar. 5, 2021, now Pat. No. 11,606,650, which is a continuation of application No. 15/133,896, filed on Apr. 20, 2016, now abandoned.

(51) Int. Cl.
*H04R 25/00* (2006.01)
*H04R 3/00* (2006.01)

(52) U.S. Cl.
CPC ........... *H04R 25/507* (2013.01); *H04R 3/005* (2013.01); *H04R 25/453* (2013.01); *H04R 25/558* (2013.01); *H04R 2225/023* (2013.01)

(58) Field of Classification Search
CPC .... H04R 25/507; H04R 3/005; H04R 25/453; H04R 25/558; H04R 2225/023; H04R 25/407; H04M 9/082; G05B 13/0285
See application file for complete search history.

(56) References Cited

U.S. PATENT DOCUMENTS 5,282,261 A   1/1994  Skeirik
5,533,120 A   7/1996  Staudacher
(Continued)

FOREIGN PATENT DOCUMENTS

WO   WO-2014094866 A1   6/2014

OTHER PUBLICATIONS

"U.S. Appl. No. 15/133,896, Advisory Action mailed Feb. 18, 2020", 3 pgs.
(Continued)

*Primary Examiner* — Angelica M Mckinney
(74) *Attorney, Agent, or Firm* — Schwegman Lundberg & Woessner, P.A.

(57) ABSTRACT

Disclosed herein, among other things, are apparatus and methods for neural network-driven feedback cancellation for hearing assistance devices. Various embodiments include a method of signal processing an input signal in a hearing assistance device to mitigate entrainment, the hearing assistance device including a receiver and a microphone. The method includes performing neural network processing to identify acoustic features in a plurality of audio signals and predict target outputs for the plurality of audio signals, and using the trained neural network to control acoustic feedback cancellation of the input signal.

20 Claims, 2 Drawing Sheets

(56) References Cited

U.S. PATENT DOCUMENTS

| | | | |
|---|---|---|---|
| 5,604,812 A | | 2/1997 | Meyer |
| 5,621,724 A | * | 4/1997 | Yoshida ................ H04M 9/082 |
| | | | 370/290 |
| 5,636,285 A | * | 6/1997 | Sauer ................... H04R 25/507 |
| | | | 381/314 |
| 5,754,661 A | * | 5/1998 | Weinfurtner ......... H04R 25/507 |
| | | | 706/2 |
| 6,035,050 A | | 3/2000 | Weinfurtner et al. |
| 6,044,163 A | | 3/2000 | Weinfurtner |
| 6,674,867 B2 | * | 1/2004 | Basseas ............. G05B 13/0285 |
| | | | 381/314 |
| 7,149,320 B2 | | 12/2006 | Haykin et al. |
| 7,187,778 B2 | | 3/2007 | Basseas |
| 7,400,738 B2 | | 7/2008 | Niederdrank et al. |
| 7,742,608 B2 | | 6/2010 | Truong et al. |
| 7,769,702 B2 | | 8/2010 | Messmer et al. |
| 7,889,879 B2 | | 2/2011 | Dillon et al. |
| 8,199,948 B2 | | 6/2012 | Theverapperuma |
| 8,681,999 B2 | | 3/2014 | Theverapperuma et al. |
| 9,094,769 B2 | | 7/2015 | Bisgaard et al. |
| 9,648,430 B2 | | 5/2017 | Dittberner et al. |
| 10,097,930 B2 | | 10/2018 | Nakagawa et al. |
| 10,575,103 B2 | | 2/2020 | Fitz et al. |
| 11,606,650 B2 | * | 3/2023 | Fitz ...................... H04R 25/507 |
| 11,985,482 B2 | * | 5/2024 | Fitz ........................ H04R 3/005 |
| 2003/0133521 A1 | | 7/2003 | Chen et al. |
| 2003/0185411 A1 | | 10/2003 | Atlas et al. |
| 2005/0047620 A1 | | 3/2005 | Fretz |
| 2005/0105750 A1 | | 5/2005 | Frohlich et al. |
| 2006/0126872 A1 | | 6/2006 | Allegro-Baumann et al. |
| 2007/0297627 A1 | | 12/2007 | Puder |
| 2008/0095389 A1 | | 4/2008 | Theverapperuma |
| 2008/0130927 A1 | * | 6/2008 | Theverapperuma ......................... |
| | | | H04R 25/453 |
| | | | 381/318 |
| 2009/0067651 A1 | | 3/2009 | Klinkby et al. |
| 2010/0027820 A1 | | 2/2010 | Kates |
| 2010/0166200 A1 | | 7/2010 | Truong et al. |
| 2012/0230503 A1 | | 9/2012 | Theverapperuma |
| 2013/0195297 A1 | | 8/2013 | Burns |
| 2014/0355798 A1 | | 12/2014 | Sabin |
| 2016/0255446 A1 | | 9/2016 | Bernardi et al. |
| 2016/0284346 A1 | | 9/2016 | Visser et al. |
| 2016/0309267 A1 | | 10/2016 | Fitz et al. |
| 2017/0148444 A1 | | 5/2017 | Bocklet et al. |
| 2017/0311091 A1 | | 10/2017 | Nakagawa |
| 2017/0311095 A1 | | 10/2017 | Fitz et al. |
| 2019/0034791 A1 | | 1/2019 | Busch et al. |
| 2019/0042881 A1 | | 2/2019 | Lopatka et al. |
| 2021/0195345 A1 | | 6/2021 | Fitz et al. |
| 2022/0256294 A1 | | 8/2022 | Diehl et al. |
| 2023/0328463 A1 | | 10/2023 | Fitz et al. |

OTHER PUBLICATIONS

"U.S. Appl. No. 15/133,896, Advisory Action mailed Oct. 25, 2018", 3 pgs.
"U.S. Appl. No. 15/133,896, Final Office Action mailed Aug. 8, 2018", 22 pgs.
"U.S. Appl. No. 15/133,896, Final Office Action mailed Sep. 21, 2017", 17 pgs.
"U.S. Appl. No. 15/133,896, Final Office Action mailed Nov. 29, 2019", 20 pgs.
"U.S. Appl. No. 15/133,896, Final Office Action mailed Dec. 10, 2020", 21 pgs.
"U.S. Appl. No. 15/133,896, Non Final Office Action mailed Jan. 12, 2018", 20 pgs.
"U.S. Appl. No. 15/133,896, Non Final Office Action mailed Mar. 10, 2017", 23 pgs.
"U.S. Appl. No. 15/133,896, Non Final Office Action mailed May 23, 2019", 21 pgs.
"U.S. Appl. No. 15/133,896, Non Final Office Action mailed Jun. 19, 2020", 20 pgs.
"U.S. Appl. No. 15/133,896, Response filed Jan. 29, 2020 to Final Office Action mailed Nov. 29, 2019", 9 pgs.
"U.S. Appl. No. 15/133,896, Response filed Mar. 2, 2020 to Advisory Action mailed Feb. 18, 2020", 9 pgs.
"U.S. Appl. No. 15/133,896, Response filed Apr. 12, 2018 to Non Final Office Action mailed Jan. 12, 2018", 8 pgs.
"U.S. Appl. No. 15/133,896, Response filed Jun. 12, 2017 to Non Final Office Action mailed Mar. 10, 2017", 9 pgs.
"U.S. Appl. No. 15/133,896, Response filed Sep. 17, 2020 to Non Final Office Action mailed Jun. 19, 2020", 11 pgs.
"U.S. Appl. No. 15/133,896, Response Filed Oct. 3, 2018 to Final Office Action mailed Aug. 8, 2018", 9 pgs.
"U.S. Appl. No. 15/133,896, Response filed Nov. 21, 2017 to Final Office Action mailed Sep. 21, 2017", 7 pgs.
"U.S. Appl. No. 15/133,896, Response filed Aug. 22, 2019 to Non-Final Office Action mailed May 23, 2019", 10 pgs.
"U.S. Appl. No. 17/249,581, Advisory Action Before Filing of an Appeal Brief mailed Oct. 25, 2022", 3 pgs.
"U.S. Appl. No. 17/249,581, Final Office Action mailed Aug. 12, 2022", 15 pgs.
"U.S. Appl. No. 17/249,581, Non Final Office Action mailed Apr. 27, 2022", 14 pgs.
"U.S. Appl. No. 17/249,581, Notice of Allowance mailed Nov. 7, 2022", 9 pgs.
"U.S. Appl. No. 17/249,581, Response filed Jul. 26, 2022 to Non Final Office Action mailed Apr. 27, 2022", 9 pgs.
"U.S. Appl. No. 17/249,581, Response filed Oct. 11, 2022 to Final Office Action mailed Aug. 12, 2022", 9 pgs.
"U.S. Appl. No. 17/249,581, Supplemental Notice of Allowability mailed Feb. 10, 2023", 2 pgs.
"U.S. Appl. No. 18/120,665, Non Final Office Action mailed Sep. 22, 2023", 17 pgs.
"U.S. Appl. No. 18/120,665, Notice of Allowance mailed Jan. 9, 2024", 10 pgs.
"U.S. Appl. No. 18/120,665, Preliminary Amendment filed Jun. 28, 2023", 6 pgs.
"U.S. Appl. No. 18/120,665, Response filed Dec. 19, 2023 to Non Final Office Action mailed Sep. 22, 2023", 7 pgs.
"European Application No. 17167360.1, Extended European Search Report mailed Aug. 24, 2017", 9 pgs.
"European Application Serial No. 17167360.1, Response filed Apr. 24, 2018 to Communication pursuant to Rules 70(2) and 70a(2)/ Rule 39(1) mailed Oct. 25, 2017", 28 pgs.
"European Application Serial No. 20153888.1, Office Action Mailed Sep. 27, 2022", 6 pgs.
Chen, J., et al., "A Feature Study for Classification-Based Speech Separation at Low Signal-to-Noise Ratios", IEEE/ACM Trans. Audio Speech Lang. Process., 22, (2014), 1993-2002.
Gerhard, David, "Audio Signal Classification: History and Current Techniques", Department of Computer Science University of Regina, Technical Report TR-CS 2003-07, (Nov. 2003), 38 pgs.
Gil-Cacho, J.M., et al., "Wiener variable step size and gradient spectral variance smoothing for double-talk-robust acoustic echo cancellation and acoustic feedback cancellation", Signal Processing, 104, (Jun. 7, 2013), 30 pgs.
Healy, Eric W., et al., "An algorithm to improve speech recognition in noise for hearing- impaired listeners", Journal of the Acoustical Society of America, 134, (2013), 3029-3038.
Ji, et al., "An Efficient Adaptive Feedback cancellation using by Independent component analysis for hearing aids", Engineering in Medicine and Biology Society, 27th Annual International Conference of the Shanghai, (Jan. 1, 2005), 2711-2713.
Manders, Alastair J, et al., "Objective Prediction of the Sound Quality of Music Processed by an Adaptive Feedback Canceller", IEEE Transactions on Audio, Speech and Language Processing, IEEE, vol. 20, No. 6, (Aug. 1, 12), 1734-1745.
Shiva, Gholami-Boroujeny, et al., "Neural network-based adaptive noise cancellation for enhancement of speech auditory brainstem responses", Signal, Image and Video Processing, vol. 10, No. 2, (Feb. 17, 2015), 389-395.

* cited by examiner

NEURAL NETWORK-DRIVEN FEEDBACK CANCELLATION

CROSS-REFERENCE TO RELATED APPLICATION

This application is a continuation of U.S. patent application Ser. No. 18/120,665, filed Mar. 13, 2023, which is a continuation of U.S. patent application Ser. No. 17/249,581, filed Mar. 5, 2021, which is a continuation of U.S. patent application Ser. No. 15/133,896, filed Apr. 20, 2016, which applications are incorporated by reference herein in their entirety.

TECHNICAL FIELD

This document relates generally to hearing systems and more particularly to neural network-driven feedback cancellation for hearing devices.

BACKGROUND

Hearing devices provide sound for the wearer. Some examples of hearing devices are headsets, hearing aids, speakers, cochlear implants, bone conduction devices, and personal listening devices. Hearing aids provide amplification to compensate for hearing loss by transmitting amplified sounds to their ear canals. In various examples, a hearing aid is worn in and/or around a patient's ear.

Adaptive feedback cancellation is used in many modern hearing aids. Adaptive feedback cancellation algorithms may suffer in the presence of strongly self-correlated input signals, such as pitched speech and music. The performance degradation results in lower added stable gain, and audible artifacts, referred to as entrainment. Signal processing systems that reduce entrainment by processing the output of the hearing aid can restore added stable gain, but introduce additional audible sound quality artifacts. These artifacts may occur during voiced speech, but are most egregious for music signals, in which persistent tones aggravate the entraining behavior and magnify the sound quality artifacts.

There is a need in the art for improved feedback cancellation to mitigate unwanted adaptive feedback cancellation artifacts, such as those from entrainment, in hearing devices.

SUMMARY

Disclosed herein, among other things, are apparatus and methods for neural network-driven feedback cancellation for hearing devices. Various embodiments include a method of processing an input signal in a hearing device to mitigate entrainment, the hearing device including a receiver and a microphone. The method includes performing neural network training to identify acoustic features in a plurality of audio signals and predict target outputs for the plurality of audio signals, and using the trained network in a processor to control acoustic feedback cancellation of the input signal.

Various aspects of the present subject matter include a hearing device having a microphone configured to receive audio signals, and a processor configured to process the audio signals to correct for a hearing impairment of a wearer. The processor is further configured to train a neural network to identify acoustic features in a plurality of audio signals and predict target outputs for the plurality of audio signals, and to control acoustic feedback cancellation of the input signal using the results of the neural network processing. In various embodiments, the network is pre-trained offline and loaded onto the hearing device processor, where it is used to control feedback cancellation and/or phase modulation.

This summary is an overview of some of the teachings of the present application and not intended to be an exclusive or exhaustive treatment of the present subject matter. Further details about the present subject matter are found in the detailed description and appended claims. The scope of the present invention is defined by the appended claims and their legal equivalents.

BRIEF DESCRIPTION OF THE DRAWINGS

Various embodiments are illustrated by way of example in the figures of the accompanying drawings. Such embodiments are demonstrative and not intended to be exhaustive or exclusive embodiments of the present subject matter.

DETAILED DESCRIPTION

Figure 1:
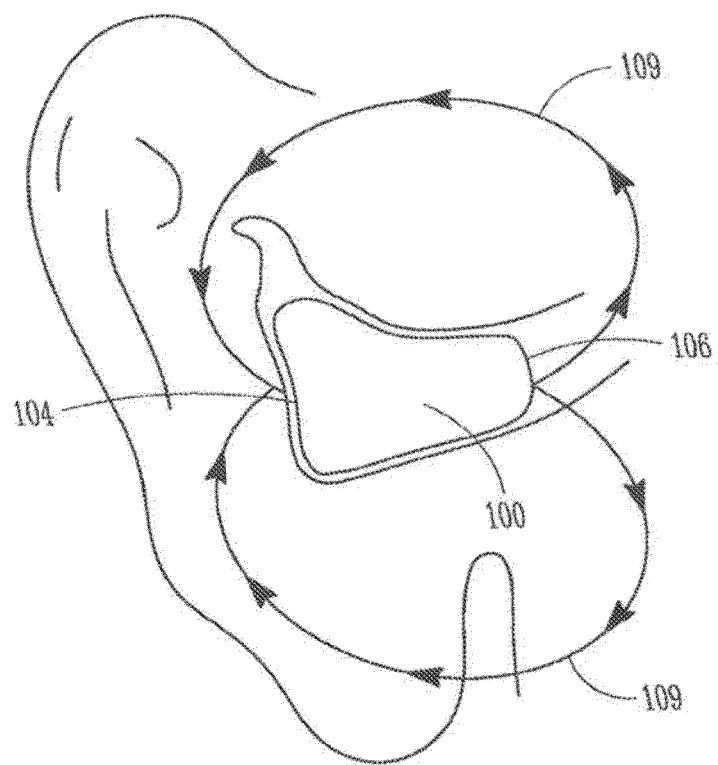
FIG. 1 is a diagram demonstrating, for example, an acoustic feedback path for one application of the present system relating to an in-the-ear hearing aid application, according to one application of the present system.

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

The present system may be employed in a variety of hardware devices, including hearing devices. The present detailed description describes hearing devices using hearing aids as an example. However, it is understood by those of skill in the art upon reading and understanding the present subject matter that hearing aids are only one type of hearing device. Other hearing devices include, but are not limited to, those described in this document.

Digital hearing aids with an adaptive feedback canceller usually suffer from artifacts when the input audio signal to the microphone is strongly self-correlated. The feedback canceller may use an adaptive technique that exploits the correlation between the feedback signal at the microphone and the receiver signal, to update a feedback canceller filter to model the external acoustic feedback. A self-correlated input signal results in an additional correlation between the receiver and the microphone signals. The adaptive feedback canceller cannot differentiate this undesired correlation from correlation due to the external acoustic feedback and borrows characteristics of the self-correlated input signal in trying to trace this undesired correlation. This results in artifacts, called entrainment artifacts, due to non-optimal feedback cancellation. The entrainment-causing self-correlated input signal and the affected feedback canceller filter are called the entraining signal and the entrained filter, respectively.

Entrainment artifacts in audio systems include whistle-like sounds that contain harmonics of the self-correlated input audio signal and can be very bothersome, and occur with day-to-day sounds such as telephone rings, dial tones, microwave beeps, and instrumental music to name a few. These artifacts, in addition to being annoying, can result in reduced output signal quality. Most previous solutions attempt to address the problem of entrainment and poor adaptive behavior in the presence of tonal and self-correlated signals by distorting the signals, such that they no longer have the properties that trigger these problems. The consequence of such an approach is that the hearing aid output is distorted or corrupted in some way. Thus, there is a need in the art for method and apparatus to reduce the occurrence of these artifacts and provide improved quality and performance.

Disclosed herein, among other things, are apparatus and methods for neural network-driven feedback cancellation for hearing devices. Various embodiments include a method of processing an input signal in a hearing device to mitigate entrainment, the hearing device including a receiver and a microphone. The method includes training a neural network to identify acoustic features in a plurality of audio signals and predict target outputs for the plurality of audio signals, and using the trained neural network on a processor to control acoustic feedback cancellation of the input signal. The present subject matter mitigates entrainment in adaptive feedback cancellation without altering hearing device output, thereby improving sound quality for tonal inputs such as speech and music.

In various embodiments, the present subject matter manipulates parameters of the feedback cancellation algorithm according to properties of the signals, to render the feedback canceller less sensitive to entrainment and improper adaptation. Thus, the present subject matter provides a much more powerful mechanism for identifying relevant signal properties and appropriate parameter manipulations, by leveraging machine learning algorithms rather than relying on heuristics, to infer the optimal relationship between signal properties and parameter adjustments rather than prescribing the known or putative relationship.

A trained neural network is provided in the hearing device to govern the adaptive behavior of the adaptive feedback canceller. Neural networks are used to learn automatically the relationship between data available in the online operation of the hearing device and optimal configuration of runtime state and/or parameters of the adaptive feedback canceller, to improve the ability of the system to accurately model the true feedback path under adverse conditions. Adverse conditions for an adaptive feedback canceller include conditions in which the feedback in the system is weak relative to the input signal, and conditions in which the input signal, and therefore output signal, is strongly self-correlated. Self-correlated signals are self-similar over a short time span, that is, delayed and attenuated versions of the signal are similar to each other. If the signal is similar to a delayed and attenuated version of itself, then at the hearing device input the feedback canceller cannot distinguish new signal from feedback. The simplest case of this self-similarity is a tonal, or pitched signal. A periodic signal is identical to versions of itself delayed by multiples of the pitch period, and thus tonal signals, like music, which are approximately periodic, are troublesome for adaptive feedback cancellers.

Feedback cancellation performance degradation manifests itself in the form of reduced accuracy in modeling the feedback path, or misalignment, which results in lower added stable gain and degraded sound quality. In the extreme case of signal self-correlation, the system begins to cancel the signal itself rather than the feedback signal, introducing audible artifacts and distortion referred to as entrainment. Entrainment artifacts may occur during voiced speech, but are most egregious for music signals, in which persistent tones aggravate the entraining behavior and magnify the artifacts. Output-processing systems break down the problematic correlation, restoring the modeling accuracy and reducing misalignment, at the expense of degrading the sound quality of the output and introducing artifacts of their own. Like entrainment itself, these artifacts are most egregious for music signals and some voiced speech.

In the present subject matter, neural network-based signal processing is used to immunize the adaptive feedback canceller against the effects of self-correlated inputs without degrading the hearing device output, by modifying the adaptive behavior of the system, rather than modifying the signal sent to the hearing device receiver. In various embodiments, neural network-based processing generalizes and infers the optimal relationship from a large number of examples, referred to as a training set. Elements of the training set comprise an example of network input and the desired target network output. During the training process, which can be performed offline, the network configuration is adapted gradually to optimize its ability to correctly predict the target output for each input in the training set. Given the training set, the network learns to extract the salient acoustic features in noisy speech signals, those that best predict the desired output from noisy input, and to optimally and efficiently combine those features to produce the desired output from the input. During a training phase, example system inputs are provided to the algorithm along with corresponding desired outputs, and over many such input-output pairs, the learning algorithms adapt their internal states to improve their ability to predict the output that should be produced for a given input. For a well-chosen training set, the algorithm will be able to learn to generalize and predict outputs for inputs that are not part of the training set. This contrasts with traditional signal processing methods, in which an algorithm designer knows and specifies, a priori, the relationship between input features and desired outputs. Most of the computational burden in machine learning algorithms (of which neural networks are an example) is loaded on the training phase. The process of adapting the internal state of a neural network from individual training examples is not costly, but for effective learning, very large training sets are required. In various embodiments, learning takes place during an offline training phase, which is done in product development or research, but not in the field. Neural network training can be performed online, in other embodiments.

A number of different neural network inputs can be used, in various embodiments. In one approach, the network is provided with the lowest-level features such as time-domain samples or complex spectra, allowing the network to learn from the greatest possible breadth of information. An alternative approach is to provide higher-level, or more abstract features as input, guiding the network towards interpretations of the data that are known to be useful. In various embodiments, a combination of high- and low-level features may be used. In the application to subband adaptive feedback cancellation in hearing devices, the primary low-level features available are the complex subband coefficients at the hearing device input, at the hearing device output (including the output delayed by the bulk delay), at the output of the FBC adaptive filter (the estimated feedback signal), and the feedback-cancelled error signal coefficients (equal to the difference between the hearing device input and the adaptive filter output). Higher-level features of interest derived from these include the subband signal log-powers (log squared magnitudes), auto-correlation coefficients, periodicity strength, etc. Any combination of high- and/or low-level acoustic features for use as neural network inputs is within the scope of this disclosure.

A number of different neural network outputs can be used, in various embodiments, and span a similar range from high to low level. At the highest level of abstraction, the neural network can be trained to select optimal values for the parameters that control the rate at which the feedback cancellation adapts, such as adaptation step size or other parameters governing the behavior of the adaptive algorithm, and closely associated with this, the amount of signal distortion introduced by the feedback cancellation or entrainment mitigation algorithms (such as phase modulation). An example of a mitigation algorithm includes output phase modulation (OPM), such as described in the following commonly assigned U.S. Patent Applications which are herein incorporated by reference in their entirety: "Output Phase Modulation Entrainment Containment for Digital Filters," Ser. No. 11/276,763, filed on Mar. 13, 2006, now issued as U.S. Pat. No. 8,116,473; and "Output Phase Modulation Entrainment Containment for Digital Filters," Ser. No. 12/336,460, filed on Dec. 16, 2008, now issued as U.S. Pat. No. 8,553,899. In various embodiments, an acoustic feature is used to recognize acoustic situations dominated by tonal signals like music, and configures the feedback cancellation accordingly by reducing adaptation rate. Alternatively, the neural network can be responsive to the state of the feedback cancelation system itself, for example modulating adaptation rates according to an estimate of the misalignment, which is the difference between estimated and true feedback paths. The misalignment can be explicitly estimated, such as with a high-level input feature, or implicitly estimated by the network.

At a lower level of abstraction, the neural network can be trained to manipulate the internal state of the adaptive system, becoming an integral component of the adaptation algorithm. For example, the adaptation gradient (or gradient direction) can be improved by predicting the gradient (or gradient angle) error using the neural network. Adaptive feedback cancellation iteratively estimates the error in its approximation of the true feedback path, and adapts the filter coefficients in a direction that reduces the error most. The present subject matter can use the neural network to learn to better estimate that error-reducing adaptation direction, in various embodiments. At an even lower level of abstraction, a neural network can be trained to predict the adaptive feedback cancellation filter coefficients directly, replacing the current adaptive algorithm altogether. In further embodiments, the neural network produces the estimated feedback signal directly, or feedback-free input signal, replacing both adaptation and filtering.

In various embodiments, other supervised machine learning algorithms can be employed in place of neural networks. The neural network can also be implemented on a device other than the hearing aid, for example, on a smart phone. In one example, applications that govern adaptation speed or step size, which change more slowly, can be implemented externally to the hearing device. In certain embodiments, the neural network training, or some part of it, can be performed online. For example, based on data collected from the hearing aid wearer's experience, the neural network can be retrained (or refined through additional training) on a smart phone, which can then download the updated network weights and/or configuration to the hearing aid. Based on data collected from a group of hearing aid wearers' experiences, such as collected on a server in the cloud, the neural network can be retrained in the cloud, connected through the smart phone, which can then download the updated network weights and/or configuration to the hearing aid in further embodiments. In one embodiment, neural networks can be employed to pre-process the signals that drive the adaptation in the feedback canceller, to improve that algorithm's performance or make it less sensitive to entrainment.

FIG. 1 is a diagram demonstrating, for example, an acoustic feedback path for one application of the present system relating to an in-the-ear hearing aid application, according to one embodiment of the present system. In this example, a hearing aid 100 includes a microphone 104 and a receiver 106. The sounds picked up by microphone 104 are processed and transmitted as audio signals by receiver 106. The hearing aid has an acoustic feedback path 109 which provides audio from the receiver 106 to the microphone 104. Various embodiments include multiple microphones, and the microphones can be used for monaural or binaural embodiments of the present subject matter.

Figure 2:
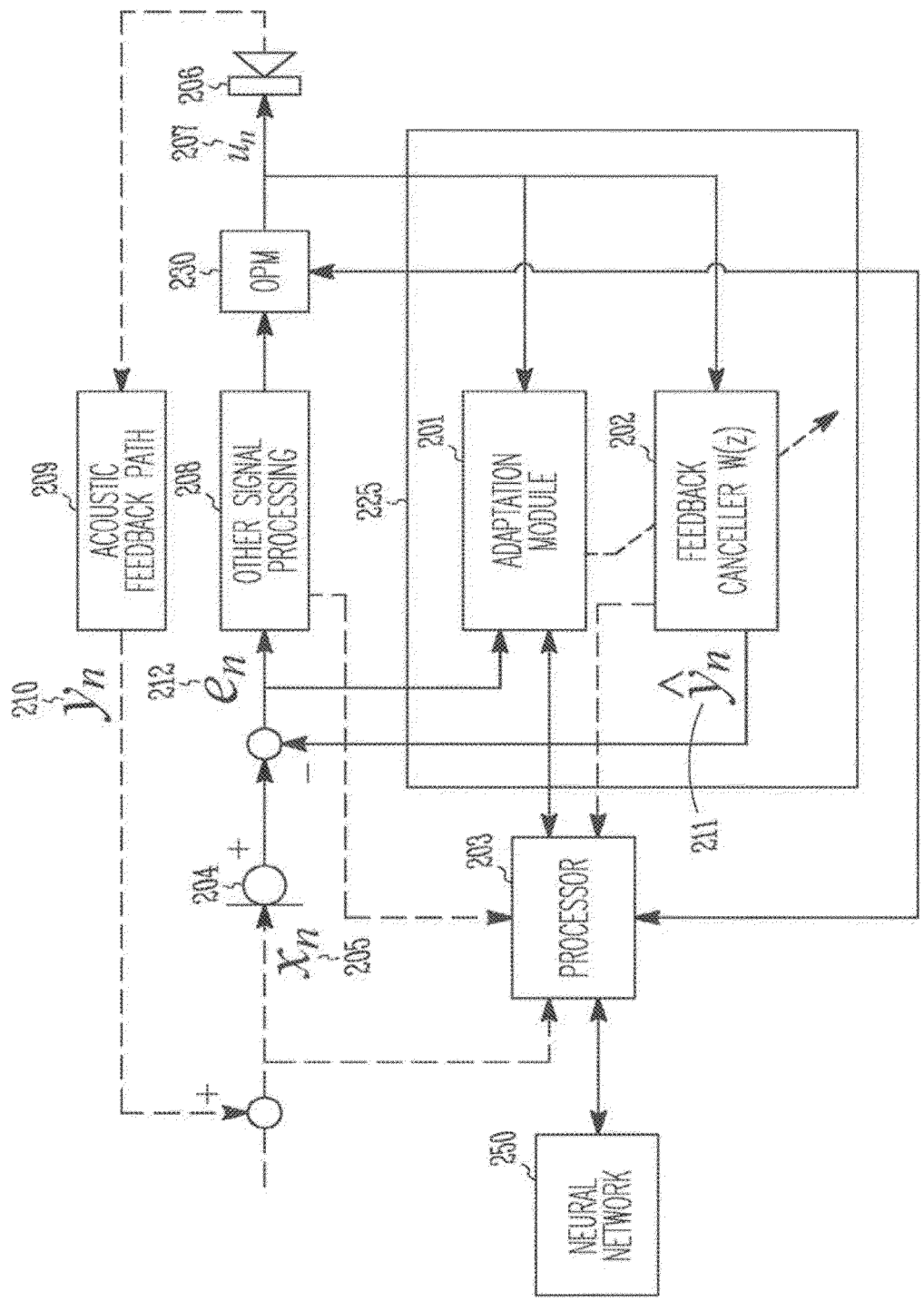
FIG. 2 illustrates an acoustic system with an adaptive feedback cancellation filter according to one embodiment of the present subject matter.

FIG. 2 illustrates an acoustic system 200 with an adaptive feedback cancellation filter 225 according to one embodiment of the present subject matter. The embodiment of FIG. 2 also includes a input device 204, such as a microphone, an output device 206, such as a speaker, processing electronics 208 for processing and amplifying a compensated input signal $e_n$ 212, and an acoustic feedback path 209 with acoustic feedback path signal $y_n$ 210. In various embodiments, the adaptive feedback cancellation filter 225 mirrors the feedback path 209 transfer function and signal $y_n$ 210 to produce a feedback cancellation signal $\hat{y}_n$ 211. When $\hat{y}_n$ 211 is subtracted from the input signal $x_n$ 205, the resulting compensated input signal $e_n$ 212 contains minimal, if any, feedback signal $y_n$ 210 components. In various embodiments, the feedback cancellation filter 225 includes an adaptive filter 202 and an adaptation module 201. The adaptation module 201 adjusts the coefficients of the adaptive filter 202 to minimize the error signal $e_n$ 212, that is, the difference between the input signal $x_n$ 205 and the adaptive filter output $\hat{y}_n$ 211. In one embodiment, a processor 203 is used to monitor the input signal $x_n$ 205, the adaptive filter output $\hat{y}_n$ 211, and/or the output signal $u_n$ 207 for indication of entrainment or filter misadjustment, or conditions likely to result in entrainment or filter misadjustment. In various embodiments, the processor 203 is further configured to train a neural network 250 to identify acoustic features in a plurality of audio signals and predict target outputs for the plurality of audio signals, and to control acoustic feedback cancellation on the input signal using the results of the neural network processing. In various embodiments, the processor 203 is further configured to control output phase modulation (OPM) 230 using the results of the neural network processing.

In various embodiments, the training is performed on the hearing device processor. In further embodiments, the training is performed an external device, for example on a server in a cloud or on a smart phone, where neural network training runs on the server or smart phone and a signal is sent to the hearing device to update parameters of feedback cancellation on the hearing assistance device. In some embodiments, a neural network is trained, or refined by means of additional or ongoing training, using data collected from many hearing aid wearers. In some embodiments, the data is collected from many hearing aid wearers while they are wearing their hearing aids in the course of normal use and transmitted to the server in the cloud using a smartphone. Various embodiments use the trained neural network to control subband acoustic feedback cancellation on the input signal, such as by manipulating parameters of adaptive feedback cancellation. In some embodiments, the neural network is trained to select optimal values for parameters that control a rate at which a feedback canceller adapts, to control depth or rate of phase modulation, to control an adaptation gradient for adaptive feedback cancellation of the input signal, to control gradient angle for feedback cancellation of the input signal, to predict adaptive feedback cancellation filter coefficients, to produce an estimated feedback signal, and/or to produce an estimated feedback-free input signal.

Hearing devices typically include at least one enclosure or housing, a microphone, hearing device electronics including processing electronics, and a speaker or "receiver." Hearing devices can include a power source, such as a battery. In various embodiments, the battery is rechargeable. In various embodiments multiple energy sources are employed. It is understood that variations in communications protocols, antenna configurations, and combinations of components can be employed without departing from the scope of the present subject matter. Antenna configurations can vary and can be included within an enclosure for the electronics or be external to an enclosure for the electronics. Thus, the examples set forth herein are intended to be demonstrative and not a limiting or exhaustive depiction of variations.

It is understood that digital hearing assistance devices include a processor. In digital hearing assistance devices with a processor, programmable gains can be employed to adjust the hearing assistance device output to a wearer's particular hearing impairment. The processor can be a digital signal processor (DSP), microprocessor, microcontroller, other digital logic, or combinations thereof. The processing can be done by a single processor, or can be distributed over different devices. The processing of signals referenced in this application can be performed using the processor or over different devices. Processing can be done in the digital domain, the analog domain, or combinations thereof. Processing can be done using subband processing techniques or other transform-domain techniques. Processing can be done using frequency domain or time domain approaches. Some processing can involve both frequency and time domain aspects. For brevity, in some examples drawings can omit certain blocks that perform frequency synthesis, frequency analysis, analog-to-digital conversion, digital-to-analog conversion, amplification, buffering, and certain types of filtering and processing. In various embodiments of the present subject matter the processor is adapted to perform instructions stored in one or more memories, which can or cannot be explicitly shown. Various types of memory can be used, including volatile and nonvolatile forms of memory. In various embodiments, the processor or other processing devices execute instructions to perform a number of signal processing tasks. Such embodiments can include analog components in communication with the processor to perform signal processing tasks, such as sound reception by a microphone, or playing of sound using a receiver (i.e., in applications where such transducers are used). In various embodiments of the present subject matter, different realizations of the block diagrams, circuits, and processes set forth herein can be created by one of skill in the art without departing from the scope of the present subject matter.

It is further understood that different hearing devices can embody the present subject matter without departing from the scope of the present disclosure. The devices depicted in the figures are intended to demonstrate the subject matter, but not necessarily in a limited, exhaustive, or exclusive sense. It is also understood that the present subject matter can be used with a device designed for use in the right ear or the left ear or both ears of the wearer.

The present subject matter is demonstrated for hearing devices, such as hearing aids, including but not limited to, behind-the-ear (BTE), in-the-ear (ITE), in-the-canal (ITC), receiver-in-canal (RIC), invisible-in-canal (IIC) or completely-in-the-canal (CIC) type hearing aids. It is understood that behind-the-ear type hearing devices can include devices that reside substantially behind the ear or over the ear. Such devices can include hearing devices with receivers associated with the electronics portion of the behind-the-ear device, or hearing devices of the type having receivers in the ear canal of the user, including but not limited to receiver-in-canal (RIC) or receiver-in-the-ear (RITE) hearing aid designs. The present subject matter can also be used in hearing devices generally, such as cochlear implant type hearing devices and blue-tooth headsets. The present subject matter can also be used in deep insertion devices having a transducer, such as a receiver or microphone. The present subject matter can be used in devices whether such devices are standard or custom fit and whether they provide an open or an occlusive design. It is understood that other hearing assistance devices not expressly stated herein can be used in conjunction with the present subject matter.

This application is intended to cover adaptations or variations of the present subject matter. It is to be understood that the above description is intended to be illustrative, and not restrictive. The scope of the present subject matter should be determined with reference to the appended claims, along with the full scope of legal equivalents to which such claims are entitled.

What is claimed is:

1. A hearing device, comprising:
   a microphone configured to receive an input signal, the input signal being sound picked up by the microphone; and
   a processor configured to process the input signal to correct for a hearing impairment of a wearer, the processor further configured to use a machine learning algorithm to govern adaptive feedback cancellation on the input signal, the machine learning algorithm trained to learn and improve feedback cancellation parameters through analysis of input signals.

2. The hearing device of claim 1, further comprising an adaptive feedback cancellation filter to provide the adaptive feedback cancellation on the input signal.

3. The hearing device of claim 1, wherein the machine learning algorithm comprises a trained neural network.

4. The hearing device of claim 1, wherein the machine learning algorithm is trained to identify acoustic features in the input signal.

5. The hearing device of claim 4, wherein the machine learning algorithm is trained to predict target parameters for the input signal using the identified acoustic features.

6. The hearing device of claim 5, wherein the processor is configured to use the target parameters predicted by the trained algorithm to govern the adaptive feedback cancellation on the input signal.

7. The hearing device of claim 1, wherein the machine learning algorithm is trained offline from data collected during normal use of the hearing device.

8. The hearing device of claim 7, wherein the training is performed on an external device.

9. The hearing device of claim 8, wherein the training is performed based on data collected from wearers stored on a server connected to the hearing device by a communication network.

10. The hearing device of claim 9, wherein neural network processing runs on the server and is configured to update parameters of feedback cancellation on the hearing device.

11. The hearing device of claim 8, wherein the training is performed on a mobile device.

12. The hearing device of claim 11, wherein neural network processing runs on the mobile device and updates parameters of feedback cancellation on the hearing device.

13. The hearing device of claim 1, wherein the hearing device is a hearing aid.

14. A method of signal processing an input signal of a hearing device including a microphone and a processor, the method comprising:
- receiving, by the processor, the input signal based on sound picked up by the microphone;
- processing, by the processor, the input signal to correct for a hearing impairment of a wearer; and
- using, by the processor, a machine learning algorithm to govern adaptive feedback cancellation on the input signal, the machine learning algorithm trained to learn and improve feedback cancellation parameters through analysis of input signals.

15. The method of claim 14, wherein using the machine learning algorithm includes using a trained neural network.

16. The method of claim 14, wherein using the machine learning algorithm to govern adaptive feedback cancellation includes using an adaptive feedback cancellation filter of the hearing device to provide the adaptive feedback cancellation on the input signal.

17. The method of claim 16, further comprising training the machine learning algorithm to identify a relationship between data available in online operation of the hearing device and an optimal configuration of runtime parameters of the adaptive feedback cancellation filter.

18. The method of claim 14, further comprising using the machine learning algorithm to control subband acoustic feedback cancellation of the input signal.

19. The method of claim 14, further comprising using the machine learning algorithm to control output phase modulation (OPM) for the hearing device.

20. The method of claim 14, further comprising using the machine learning algorithm to mitigate entrainment and to modify adaptive behavior to avoid self-correlated input for the hearing device.

* * * * *